US005353388A

United States Patent [19]

Motoyama

[11] Patent Number: 5,353,388

[45] Date of Patent: Oct. 4, 1994

[54] SYSTEM AND METHOD FOR DOCUMENT PROCESSING

[75] Inventor: Tetsuro Motoyama, San Jose, Calif.

[73] Assignees: Ricoh Company, Ltd., Tokyo, Japan; Ricoh Corporation, San Jose, Calif.

[21] Appl. No.: 778,578

[22] Filed: Oct. 17, 1991

[51] Int. Cl.[5] .................................................. G06F 3/12

[52] U.S. Cl. .................................... 395/117; 395/114

[58] Field of Search ............... 395/112, 114, 117, 800, 395/425, 157, 159, 275, 775; 364/419.1; 345/119

[56] References Cited

U.S. PATENT DOCUMENTS

| | | | |
|---|---|---|---|
| 4,651,278 | 3/1987 | Herzog et al. | 395/275 |
| 4,672,459 | 6/1987 | Kudo . | |
| 4,827,349 | 5/1989 | Ogata et al. . | |
| 5,041,918 | 8/1991 | Ishida et al. . | |
| 5,075,874 | 12/1991 | Steeves et al. | 395/112 |
| 5,220,674 | 6/1993 | Morgan et al. | 395/800 |

OTHER PUBLICATIONS

ISO/IEC DIS 10180, Information Processing—Text Communication—Standard Page Description Language, Ch. 4–7.

The Seybold Report on Desktop Publishing–Apr. 8, 1988, v5, N8, p. 43(1).

PC Week, Apr. 12, 1988, v5, N15, PC 38(2).

*Primary Examiner*—Dale M. Shaw
*Assistant Examiner*—U. Chauhan
*Attorney, Agent, or Firm*—Oblon, Spivak, McClelland, Maier & Neustadt

[57] ABSTRACT

A document processing system controls the printing of documents represented in page description language form. Documents are represented by a page description language which is structured so that definition and declaratory commands are positioned only at the beginning of each distinct document segment. Each document has prologue sections, which contain definition and declaratory commands, and content portions which contain the specific tokens or commands for defining specific images. The definition and declaratory commands in the prologue sections of the document are arranged in a hierarchical tree so that each definition and declaratory command has a scope corresponding to the portion of the hierarchical tree subtended by that command. A structure processor handles resource declaration and definitions, dictionary generation, context declarations and references to data external to the document. A content processor processes the tokens using the definitions and declarations set up by the structure processor, and an imaging driver module translates the document into commands suitable for any of several types of printers, as well as for communication by telephone line to a remote device. One feature of the document processing system is the ability to query a remote device to determine whether it has the resources required for processing a document transmitted in a high level encoded form. It then either transmits the document in rasterized bit map form if the required resources are not available, or transmits the document in a higher level encoded form if the required resources are available.

4 Claims, 8 Drawing Sheets

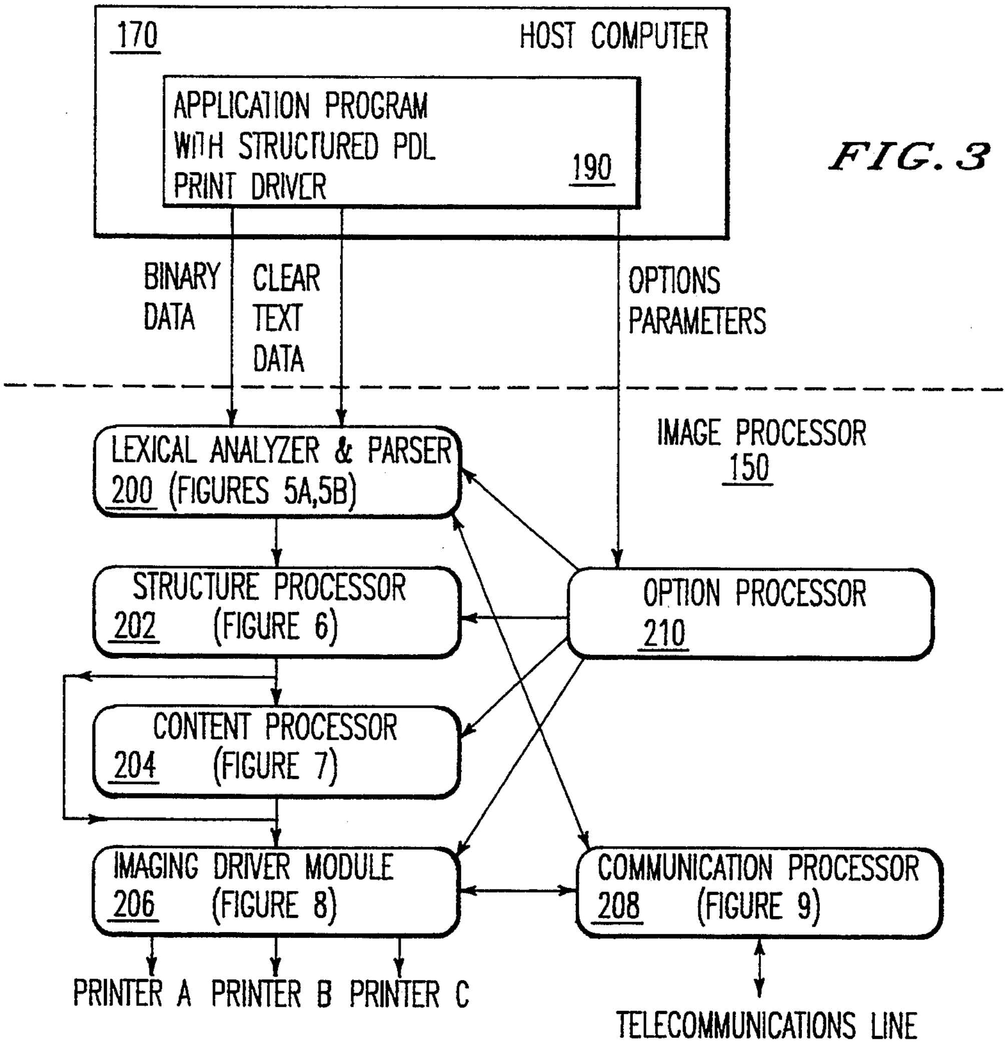
FIG. 3
FIG. 4
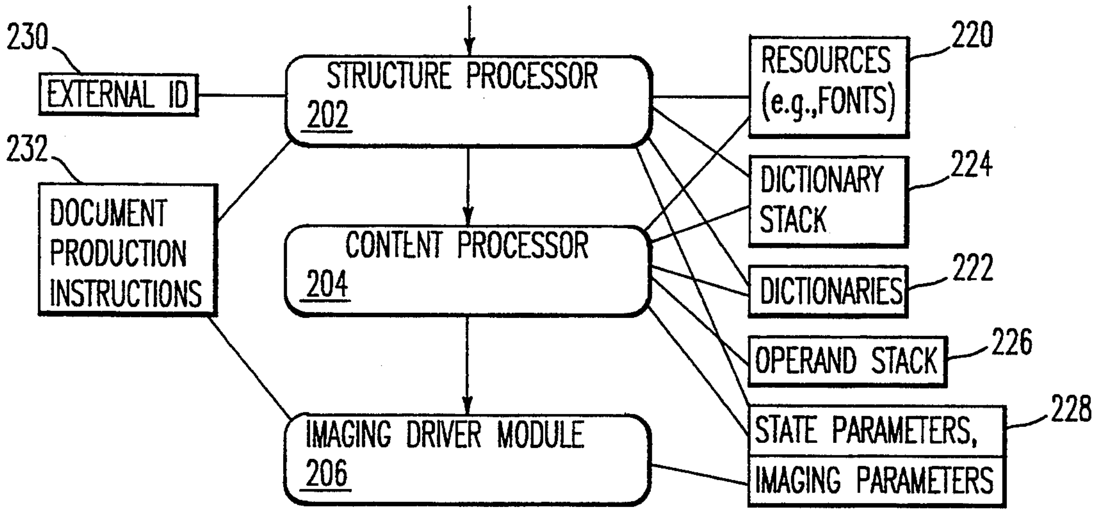

SYSTEM AND METHOD FOR DOCUMENT PROCESSING

The present invention relates generally to computer controlled printing of documents having text and graphical components, and particularly to methods and systems for translating documents, represented in a structured page description language, into a number of different formats suitable for use with a variety of printing devices and also for transmission to other devices such as facsimile transceivers.

BACKGROUND OF THE INVENTION

Prior to the introduction of laser printers in 1980, the control commands transmitted by computers to printers were so-called escape sequence commands because commands were distinguished from character data by preceding each command with a special byte called the escape character. This methodology worked well with daisy wheel and dot matrix printers, but was not well suited for printing documents that combined text and graphical images.

A new type of printer control methodology, using a "Page Description Language" (PDL) was developed to control laser printers. Various PDL's were developed in the 1980s, the best known examples being PostScript (a trademark of Adobe Systems Incorporated) and Interpress, although a number of proprietary PDL's are used by different printers. These prior art PDLs introduced many useful printer control methodologies, including such tools as Resource Declarations, Context Declarations, Dictionaries, the use of memory stacks, as well as a large number of predefined commands for defining specific graphical image elements, for controlling the contents of the printer controller's memory, and so on. These features of the prior art PDLs are extensively documented in publicly available manuals such as Adobe System Incorporated's "PostScript Language Reference Manual" and its "PostScript Language Program Design", both published by Addison-Wesley Publishing Company. Another publication concerning PDL's is "Interpress, The Source Book" by Steven J. Harrington and Robert R. Buckley, published by Simon & Schuster, Inc. (1988). A publication concerning a proposed standard page description language (SPDL) which organizes documents in a hierarchical manner is "ISO/IEC DIS 10180, Information Processing-Text Communication-Standard Page Description Language" (1991).

One shortcoming of PostScript is the fact that the Page Description for a particular document can contain new definition, such as a new resource definition (e.g., for an additional font to be used in the document) or a new dictionary definition anywhere within the document. As a result, the entire contents of the document must be inspected in order to determine whether a particular printer has the resources necessary to print a particular document. Alternately, it is quite possible for the printing of a document to fail at any point during the printing process due to the inability of the printer to comply with the commands of the document's page description.

Another problem associated with PostScript is that in order to print a specified page of a document, it is necessary to read the entire PDL description of all the preceding pages of the document in order to determine the state of the documents page setup parameters (i.e., Resource Declarations, Dictionary Definitions, and so on) at the beginning of the specified page. In other words, the print controller or a print driver program must read the entire PDL description of the document to take into account the effect of every page setup command between the beginning of the document and the specified page. While this page setup scanning process is straightforward, it is wasteful. Adobe System Inc. has proposed programming conventions to avoid or reduce this problem.

Interpress uses free formatted prologues which can be used to avoid the above problem. The Standard Page Description Language proposed by ISO on the other hand uses prologues having a predetermined fixed format.

Other shortcomings in the prior art include the failure to provide systems which are designed to translate documents between various printer command formats, various page description languages, as well as other types of devices such as facsimile machines.

The present invention provides an improved image processor, which processes documents represented by statements in a structured page description language (such as the Standard Page Description Language proposed by ISO), converts documents between a variety of different document description formats, and also transmits documents to remote devices in accordance with the resources available at those remote devices, thereby using the most efficient data transmission format which is compatible with the receiving remote device.

SUMMARY OF THE INVENTION

In summary, the present invention is a document processing system for controlling the printing of documents represented in page description language form. Documents are represented by a page description language which is structured so that definition and declaratory commands are positioned only at the beginning of each distinct document segment. More specifically, each document has optional prologue sections, which contain definition and declaratory commands, and content portions which contain the specific tokens or commands for defining specific images. Furthermore, the definition and declaratory commands in the prologue sections of the document are arranged in a hierarchical tree so that each definition and declaratory command has a scope corresponding to the portion of the hierarchical tree subtended by that command.

The document processing system includes several distinct sets of software for processing different portions of each document. A Structure Processor handles resource declaration and definitions, dictionary generation, context declarations and references to data external to the document. A Content Processor processes the tokens using the definitions and declarations set up by the Structure Processor. In addition, an Imaging Driver Module translates the document into commands suitable for any of several types of printers, as well as for communication by telephone line to a remote device.

An important advantage of the present invention is that any specified portion of a document can be processed or printed without having to process the entire document prior to the specified portion. Only structural definitions in the hierarchical tree above the specified document portion need to be processed. This is both efficient, and also facilitates determination of the resources needed by the document prior to commencing actual printing of the document. This feature is useful not only when printing a document, but also when transmitting a document to a remote device. In accordance with the present invention, the document processing system queries the remote device to determine whether it has the resources required for receiving and processing a PDL, PostScript or HP Laserjet encoded document, and then either transmits the document in rasterized form (e.g., to a fax machine or to other "raster output engine" devices such as a laser printer connected to the document processing system via a video port) if the required resources are not available, or transmits the document in a higher level encoded form if the required resources are available. By determining the resources available to the remote device, the most efficient transmission format can be used, thereby reducing transmission costs.

BRIEF DESCRIPTION OF THE DRAWINGS

Additional objects and features of the invention will be more readily apparent from the following detailed description and appended claims when taken in conjunction with the drawings, in which:

FIG. 3 is a block diagram of the software modules in the preferred embodiment.

FIG. 4 depicts the primary data structures used by the software modules in the preferred embodiment.

DESCRIPTION OF THE PREFERRED EMBODIMENT

Hierarchically Structured Page Description Language

Figure 1A:
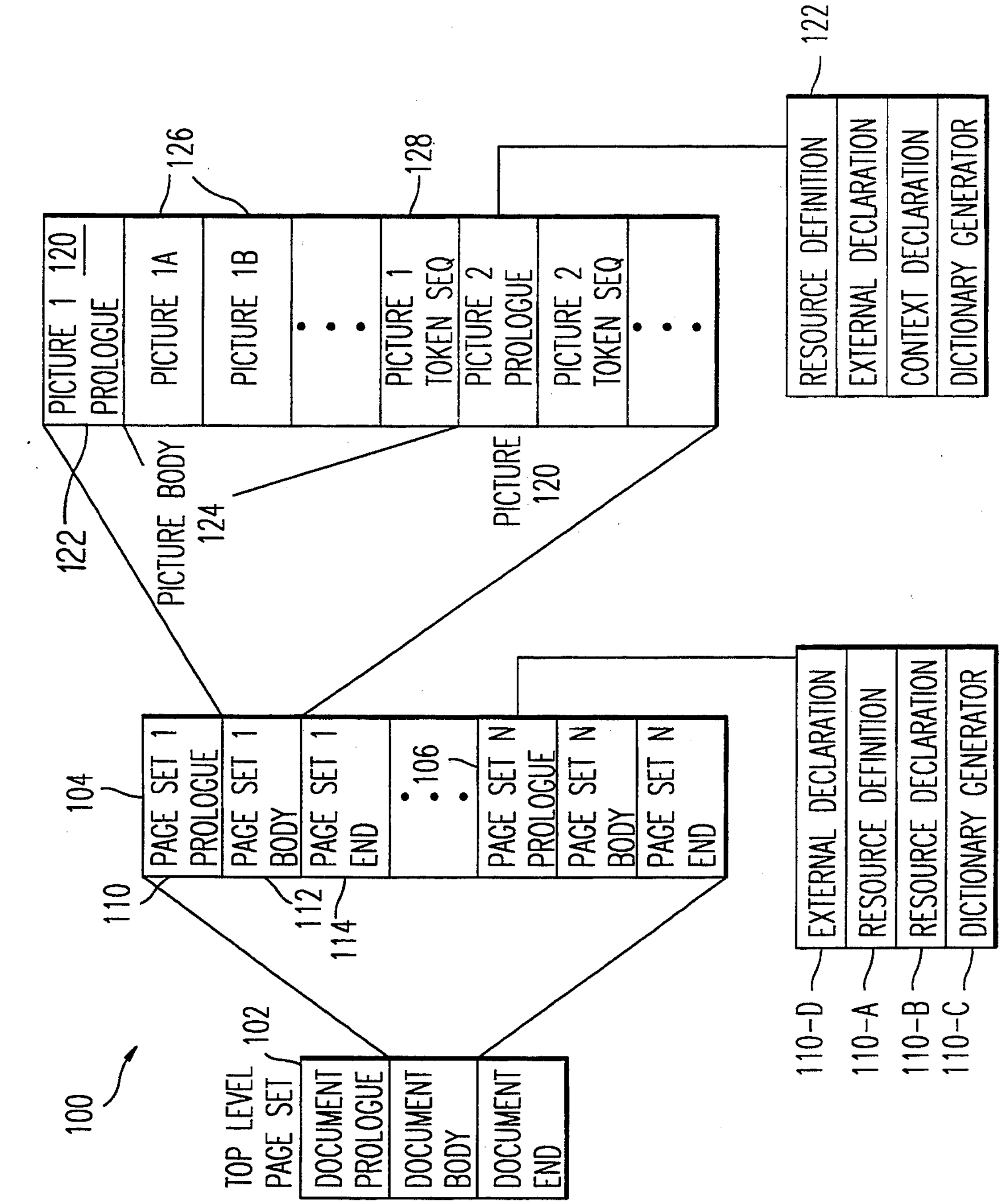
FIGS. 1A and 1B are block diagrams of a document represented in structured PDL form.
Figure 1B:
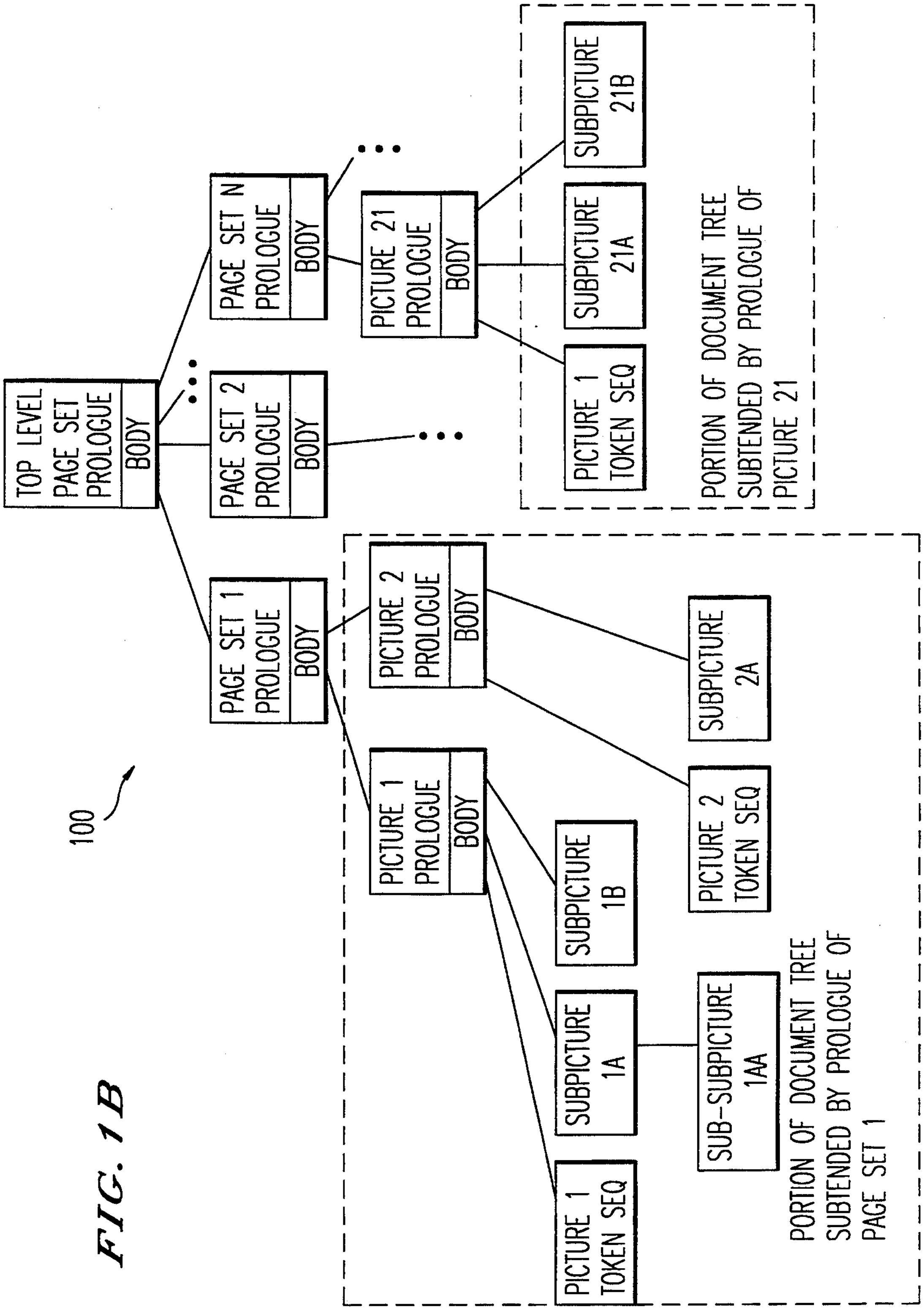

Referring to FIGS. 1A and 1B, a document 100 used by the present invention is represented by a set of page description language (PDL) elements which are divided into page sets, and pictures. Both page sets and pictures can have prologue sections that define structural elements of the document, and these prologue sections are organized in a hierarchical fashion so that the declarations and definitions in each prologue are applicable only to the subset of the document that is subtended by that prologue in the document's hierarchical structure.

A top level page set 102 sets up resources, dictionary and external definitions which are useable by the entire document.

For the purposes of this description, resources, dictionary and external definitions perform the same basic functions as they do in the PostScript page description language. For those not familiar with these terms, the following short definitions are provided. Resource declarations and definitions specify fonts, filters, fill patterns, colors, glyphs and so on, which are then available to be invoked by tokens in the document. Resource declarations bind a name to each specified resource, while resource definitions specify the exact nature of each resource. Dictionaries are used to translate key values into a specified list of tokens or other values, and thus is similar to a list of macro definitions. External definitions reference data structures external to a document, one example being the image of a corporate logo that is to be printed at the top or bottom of letters and memoranda.

In addition to the top level page set 102 are a set of second level of page sets 104, 106. Each page set 104 has a prologue 110, body 112 and end 114. The page set prologue 110 provides resource definitions 110-A and declarations 110-B, dictionary generation statements 110-C and external definitions 110-D used by subsections of the document. The body 112 of a page set consists of one or more pictures 120. A picture 120 corresponds to a contiguous segment of a document, such as a page, a portion of a page, or possibly a sequence of several pages.

The data structure of each picture 120 comprises an optional prologue 122 followed by a picture body 124. The picture body 124 can contain one or more sub-pictures 126, as well as a token sequence 128 which defines the images in one segment of the document (e.g., the image elements for one page). Picture prologues 122 provide resource declarations and definitions, dictionary generation statements and context definitions used solely by that one picture (i.e., that segment of the document).

Looking at FIGS. 1A-1B as a whole, the data structure embodying document 100 is structured hierarchically. Prologues, containing definition and declaratory commands, are positioned only at the beginning of each distinct document segment. More specifically, each document has optional prologue sections, which contain definition and declaratory commands, and content portions which contain the specific tokens or commands for defining specific images. Furthermore, the definition and declaratory commands in the prologue sections of the document are arranged in a hierarchical tree so that each definition and declaratory command has a scope corresponding to the portion of the hierarchical tree subtended by that command. Thus, for instance, the definition and declaration commands in the prologue of Page Set 1 apply only to the pictures in that page set and therefore do not apply to the pictures in Page Set N.

A formal definition of the data structure of a document is shown in Table 1.

TABLE 1

PDL Definitions

| | |
|---|---|
| document | ::= (pageset \| picture) |
| pageset | ::= (prologue)?, (pageset_body) |
| prologue | ::= (external_decl*, informative_decl*, resource_def*, resource_decl*, doc_prod_inst_decl*, context_decl*, dict_gen_decl*, set_up_proc*) |
| pageset_body | ::= (pageset \| picture) |
| picture | ::= (prologue)?, (picture_body)? |
| picture_body | ::= (picture \| tokensequence)* |

, All must occur in the order shown.
| One and only one must occur.
? Optional (0 or 1 time)
* Optional and repeatable (0 or more times)

Image Processor Hardware

Figure 2:
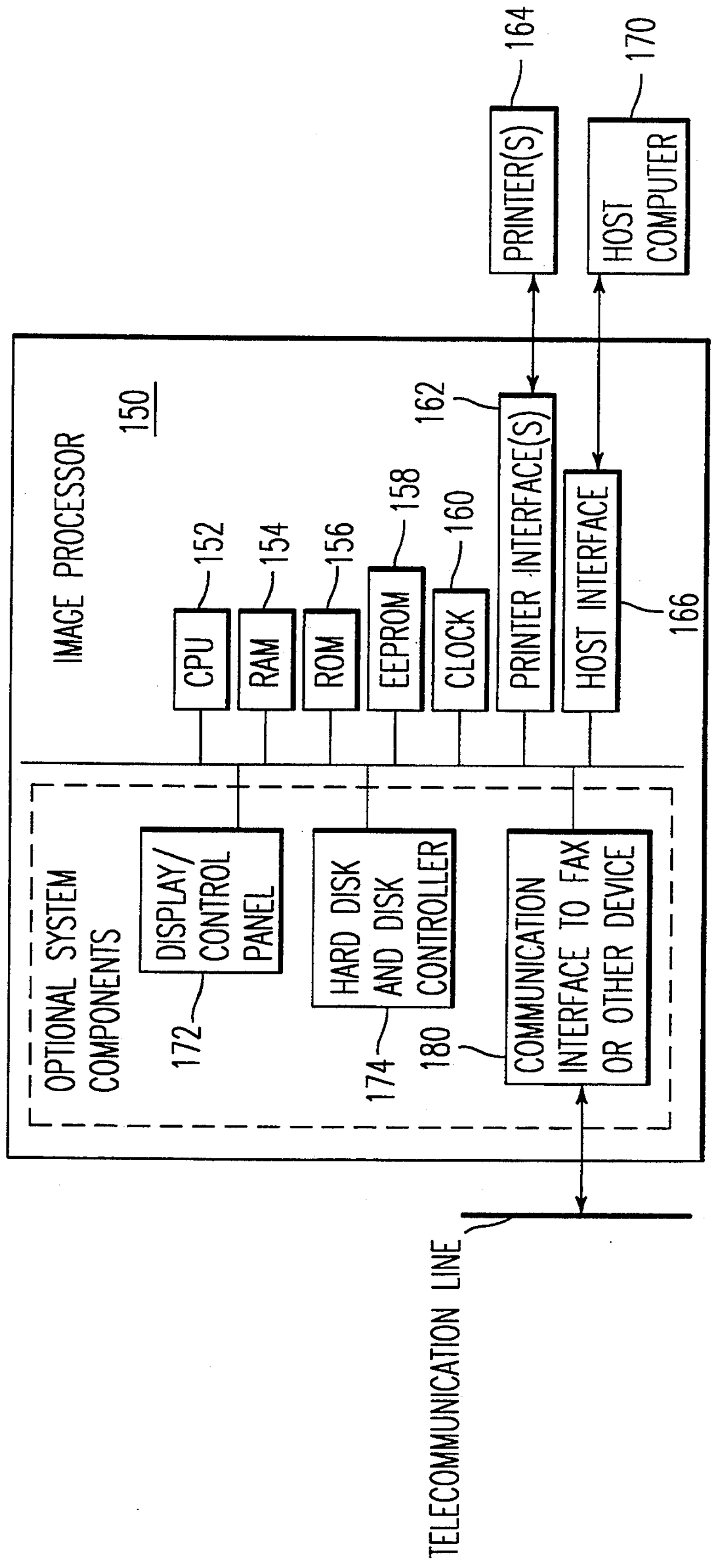
FIG. 2 is a block diagram of the hardware in a document processing system.

Referring to FIG. 2, the Image Processor 150 of the present invention is preferably implemented as a stand alone computer system having a central processing unit (CPU) 152 such as the AMD 29000 made by Advanced Micro Devices or any of the Motorola 68000 series microprocessors, and random access memory (RAM) 154 for temporary data and software storage. ROM (read only memory) 156 and EEPROM (electrically erasable read only memory) 158 store the system's software modules, which will be described below. A clock circuit 160 provides required timing signals, printer interface(s) 162 couples the Image Processor to various printer devices 164, and host interface 166 couples the Image Processor to a host computer 170, such as a Macintosh computer made by Apple Computer, or an IBM PC compatible computer.

The Image Processor 150 can optionally include other features such as display and control panel 172; a hard disk and disk controller 174 for storing items such as documents, font data, and data structures referenced by external definition statements; and a communication interface 180 or modem for telecommunication with remote devices such as facsimile machines and remotely located computers and printers.

The image processor 150 of the present invention is presented here as a stand alone device, suitable for use as a peripheral device to one or more computers, such as in the print server of a local area network or as a special printer module incorporated into a computer. However, the image processor 150 may also be used as the engine/controller of a "PDL compatible" laser or ink jet printer.

Image Processor Software Modules

Referring to FIG. 3, the document to be handled by the Image Processor 150 is typically generated by an application program 190, such as a word processing program, drawing program or document assembly program, executed by a host computer 170. The application program 190 will typically have a print driver sub-program which outputs documents using the structured PDL description described above with reference to FIGS. 1A-1B. The PDL command elements can be exported by the application in either binary or clear text form (where binary is a compact machine language format and clear text is a human readable format).

The Image Processor 150 contains several software modules 200-210 which process documents exported by the host computer 170. Lexical Analyzer and Parser 200 identifies each separate element of the document, checks for errors, disposes of documents elements which do not need to be processed, and passes the remaining document elements to Structure Processor 202. Structure Processor 202 interprets or decodes structural command elements, loading appropriate state and image parameter values into the image processor's memory, and passes content elements on to the Content Processor 204. The Structure Processor 202 also sends print control commands, such as the "page print" command issued after determining that the end of a page-has been encountered, directly to the Imaging Driver Module 206. In addition, various data structures managed by the Structure Processor 202 are translated into the target printer commands, such as PostScript commands, by the Image Driver Module 206.

If the document is being printed, the Content Processor 204 converts tokens into imaging instructions (sometimes herein called image data) suitable for the specified target printer. If the document is being transmitted to a remote device, the Content Processor 204 will either pass along elements of the document without processing them (e.g., if the remote device is a PDL compatible printer), or will convert the tokens into imaging instructions or facsimile data suitable for use by the remote device.

Imaging Driver Module 206 directs the output of the image processor 150 to a specified output device, and also handles the task of rasterizing documents being sent to devices that cannot accept higher level printing commands. Communication processor 208 coordinates the transmission of documents to and from remote devices. Finally, option processor 210 handles document options parameters from the host computer, typically defined by setup procedural elements near the beginning of the document. Options parameters control such items as the printer to be used, whether the document is to be transmitted onto a telecommunication line, how to handle non-fatal syntax errors in the PDL command stream, and so on.

Image Processor Data Structures

Referring to FIG. 4, the following data structures are used by the image processor to store information generated during the printing process. A resources data structure 220 stores definitions of the character fonts and other resources defined by the document being processed. The Structure Processor 202 handles the processing of storing resource definitions and declarations, which are then used by the Content Processor while processing tokens that reference declared resources.

Dictionaries 222 are data structures that store tables of values, as defined by dictionary generating statements in the prologue sections of the document. The dictionary stack 224 is an ordered set of pointers to dictionaries in data structure 222. Specified dictionaries are pushed onto the dictionary stack 224 and popped from the dictionary stack 224 in accordance with the scope accorded to each dictionary. Referring to FIGS. 1A-1B, a dictionary generated by the prologue in the first page set 104 would be pushed onto the dictionary stack 224 prior to processing pages of the document in that page set. That dictionary would be popped off the stack when processing of page set 1 ended and processing of another page set began, because the dictionary defined in page set 1 is not applicable to the other page sets.

Table 2 represents an example of a very short document using a page description language structured in accordance with the present invention. This document defines multiple dictionaries and resets their order within the image processor's "dictionary stack", thereby changing the order in which the dictionaries are searched for key values.

TABLE 2

Example of Document

```
<!DOCTYPE SPDL PUBLIC "XXX">
<SPDL>
<comment>
    Test File Header
    Copyright 1991 Ricoh Corporation
    All Rights Reserved
    Confidential and Proprietary
    File            : ctxtdc11.pro
```

TABLE 2-continued

Example of Document

```
  Author           : Tetsuro Motoyama
  Version          : 0.01
  File Created     : June 5, 1991
  First Draft      : June 5, 1991
  Update History:
   Description:
        This is a test file for SPDL syntax checking. It creates
        three dictionaries through the Dict. Gen. and manipulates
        the context stack by context declaration.
  Note: Put PSEUDO codes before each SPDL test file.
  - SPDL PSEUDO CODE LISTING -
  SPDL
    Document= picture       % three dictionaries are defined
     prologue
     Dictionary Generator  dictid=alpha size 3
     Dictionary Generator  dictid=beta size 4
     Dictionary Generator  dictid=gamma size 5
  pictbody
   tokenseq 2 3 a %expect the a in the gamma to be executed
    picture
     prologue
      context decl gamma beta alpha
      pictbody
       tokenseq 2 3 a %expect the a in the alpha to be executed
</comment>
 <document>
  <picture spdlid="SPDL"
  cntnttyp="SPDLClearTest" >
    <comment> spldid and cntnttyp are Public Object ID values
    </comment>
  <prologue>
    <dictgens>
     <dictgen size="3"> <dictid> <name>
     alpha</name> </dictid>
      <tokenseq>
       % The operand stack has the dictionary reference
       dup /a {add} put
       dup /d {div} put
       dup /m {mul} put
      </tokenseq> </dictgen>
     <dictgen
size="4"> <dictid> <name>beta</name> </dictid>
      <tokenseq>
       dup /a {div} put
       dup /d {mul} put
       dup /m {add} put
       dup /s {sub} put
      </tokenseq>
     </dictgen>
     <dictgen
size="5"> <dictid> <name>gamma</name> </dictid>
      <tokenseq>
       dup /a {mul} put
       dup /d {add} put
       dup /m {sub} put
      </tokenseq>
      <tokenseq>
       dup /s {div} put
       dup /c {cos} put
      </tokenseq>
     </dictgen>
    </dictgens>
    <comment>
      dictionary stack
        gamma
        beta
        alpha
    </comment>
   </prologue>
   </picbody>
    <tokenseq>
    2 3 a %expect the result to be 6
    </tokenseq>
    <picture>
     <prologue>
        <ctxtdecl>
<name>gamma</name> <name>beta</name> <name>
alpha</name>
        </ctxtdecl>
      </prologue>
      <comment>
```

TABLE 2-continued

Example of Document

```
         dictionary stack
           alpha
           beta
           gamma
       </comment>
       <picbody>
        <tokenseq>
        2 3 a %expect the result to be 5
        </tokenseq>
       </picbody>
     </picture>
   </picbody>
   </picture>  <comment> printing the first page </comment>
  </document>
</SPDL>
```

The Structure Processor 202 allocates memory for storing dictionaries, but passes dictionary generation commands to the Content Processor for creating the specific entries in each defined dictionary. The Structure Processor 202 also pushes and pops dictionary pointers onto and off of the dictionary stack 224 so as to control the scope of each dictionary. The Content Processor 204 searches the dictionaries currently in the dictionary stack 224, starting with the last added dictionary, for "key" values in tokens. If two dictionaries in the stack 224 having conflicting definitions for a particular key, the last entered definition for a specified key is the one that is used.

Operand stack 226 is a standard operand stack used for temporarily storing parameter values to be used by imaging operators (called tokens) in the content portion of the document being processed.

State parameters 228 are a set of variables or parameters which control the processing of a document. State parameters include things such as a "line joining method parameter" which defines the shaping of joints between intersecting or otherwise joined line segments, and a "specified printer" parameter defining the printer port to which the document is being sent. State parameters also include imaging parameters such as parameters which define the color being printed, the margins of the page being printed, the current clipping region, and the current drawing position (e.g., for the next letter of text to be printed).

The External ID 230 is a value corresponding to a specified external file, such as a file containing the PDL program for a company logo.

Document Production Instructions 232 define things such as the number of copies of each page that are to be printed, and the paper color to be used (n.b., a paper color instruction is conveyed by the system to an operator console requesting that the specified color paper be loaded into the printer's paper feeder).

Lexical Analyzer and Parser Process

Figure 5A:
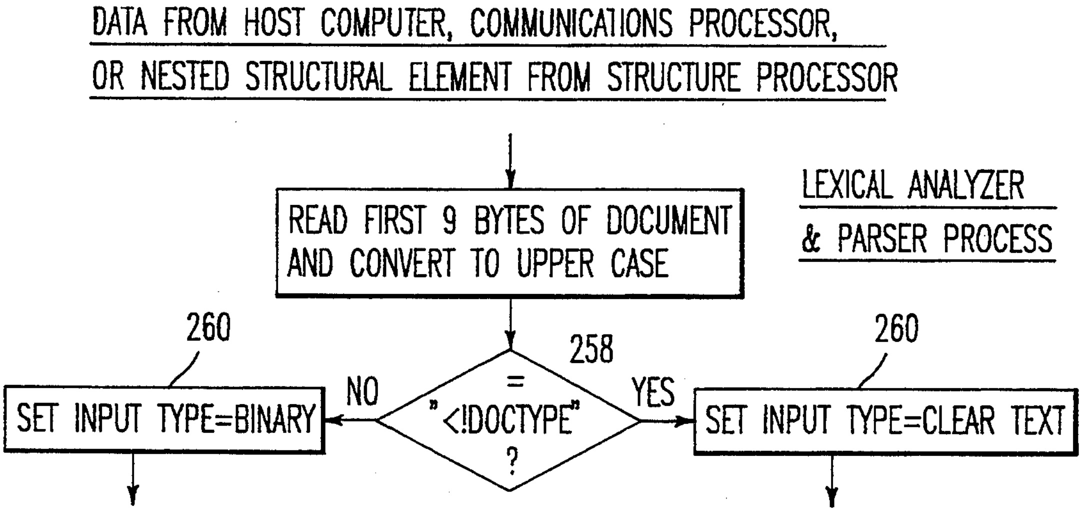
FIGS. 5A and 5B are flow charts of the process of parsing a document by the Lexical Analyzer and Parser of the preferred embodiment.
Figure 5B:
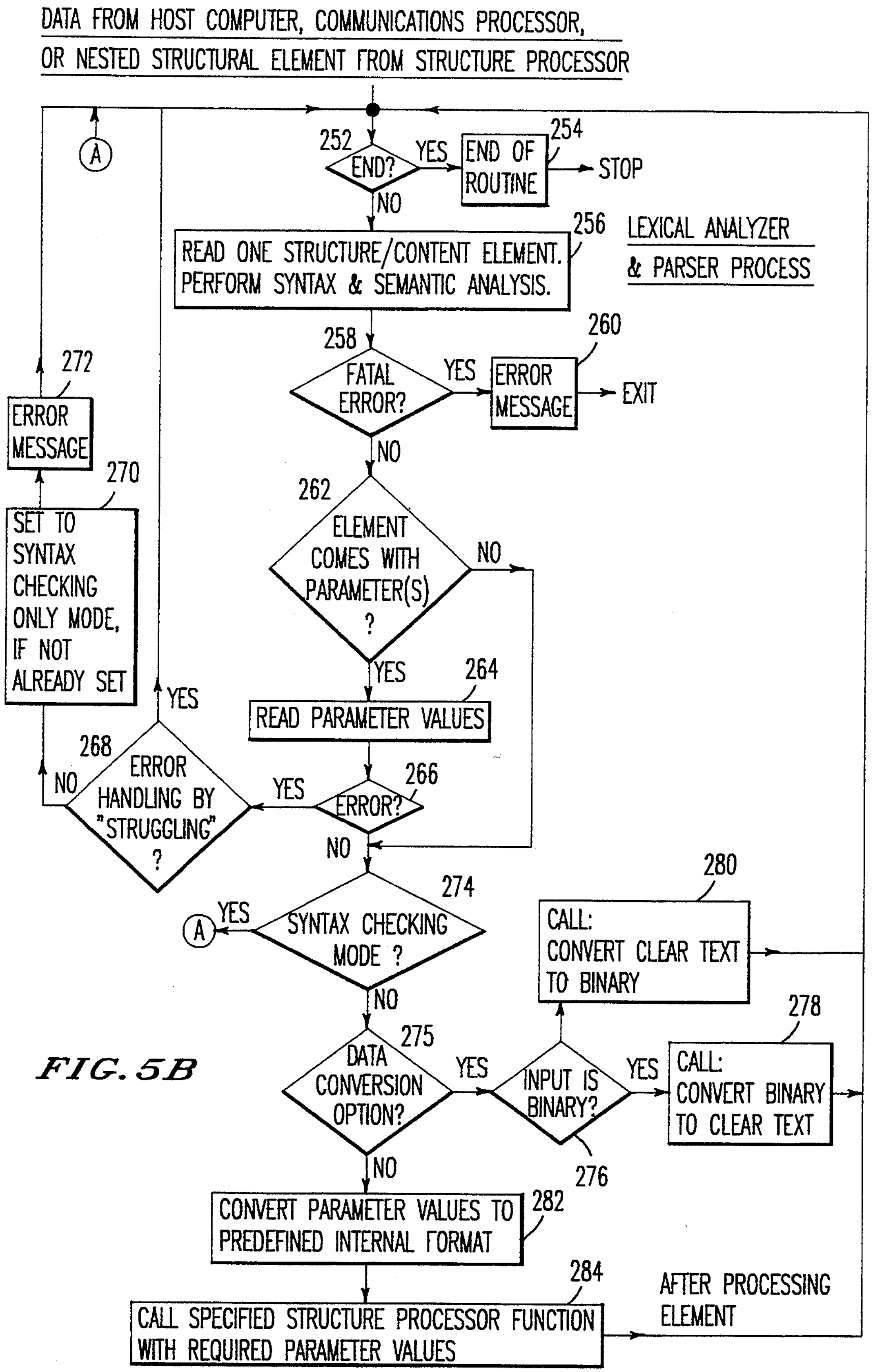

As shown in FIG. 3, the first software module to receive data representing the document to be processed is the Lexical Analyzer and Parser 200. Referring to FIGS. 5A and 5B, the Lexical Analyzer and Parser works as follows.

Referring to FIG. 5A, prior to performing any other processing on each document, the Lexical Analyzer and Parser reads the first nine characters of the document, converts them to upper case form, and compares that string with "<!DOCTYPE". If there is a match, the Lexical Analyzer and Parser concludes that document is encoded in clear text form and sets a corresponding "document type" flag, otherwise it concludes that the document is encoded in binary form and sets the document type flag accordingly. There is a one-to-one correspondence between clear text and binary formats. Binary format is more compact, while clear text is easier for humans to read. Whether a document is received in either binary or clear text form is of no consequence, except for steps 275–280 described below which provide for conversion of documents in one form to the other. After performing this initial data type check, the steps shown in FIG. 5A are not used until the beginning of another document is received.

Referring to FIG. 5B, at step 252 the lexical analyzer and parser routine checks to see if the end of the document has been reached. If so, memory allocated to the printing process is de-allocated, and the lexical analyzer and parser routine exits at step 254.

If the document's end has not been reached, then next element of the document is read in at step 256. The element may be either a structural or content element. If the element contains a fatal error (step 258), a corresponding error message is printed (step 260) and the program exits, thereby terminating processing of the document.

Assuming that a fatal error was not encountered at step 258, processing of the element depends on whether the element contains parameters (step 262). Some elements are simple statements or commands that do not have parameters, while many document elements contain parameters. If the element does not contain any parameters, processing jumps to step 274, as will be described below.

If the element being processed contains parameters, the parameter values are read at step 264, and then tested for errors at step 266. If a parameter error is detecting (indicating that illegal or inconsistent parameters values were received), processing of the error depends on whether the image processor has been instructed to "struggle"—i.e., to attempt to process documents containing non-fatal errors. If the image processor has been instructed to "struggle" (step 268), the element with the error is discarded by not processing it further and allowing processing to continue with the next element in the document. Otherwise, if "struggling" has not been enabled, the image processor's "syntax checking mode" flag (one of the image processor's state parameters) is set to syntax checking mode at step 272, meaning that nothing further in the document will be printed, and then an error message is printed at step 274 before processing resumes with the next element in the document.

If no errors in the element's parameters were detected (step 266), the "syntax checking mode" state parameter is checked at step 274. If it is set, only syntax checking is being performed and therefore the element is not processed further. Otherwise, the next step is to check to see if the "data conversion" option flag has been set (step 275), which is a state variable indicating the document is being processed solely for the purpose of converting the document from binary to clear text format, or vice versa. If the document is being converted, and the document is currently in binary form (step 276), a routine is called for converting the element being processed into clear text form (step 278). On the other hand, if the document is currently in clear text form (step 276), a routine is called for converting the element being processed into binary form (step 280).

If the data conversion option has not been selected, the element's parameters are converted and stored in a predefined internal format for later processing at step 282, and then the Structure Processor is called to process the current element at step 284. More specifically, the Structure Processor contains routines for processing every type of legal element allowed in the Page Description Language, and the appropriate one of these routines is called at step 284.

Document Structure Processor

Figure 6:
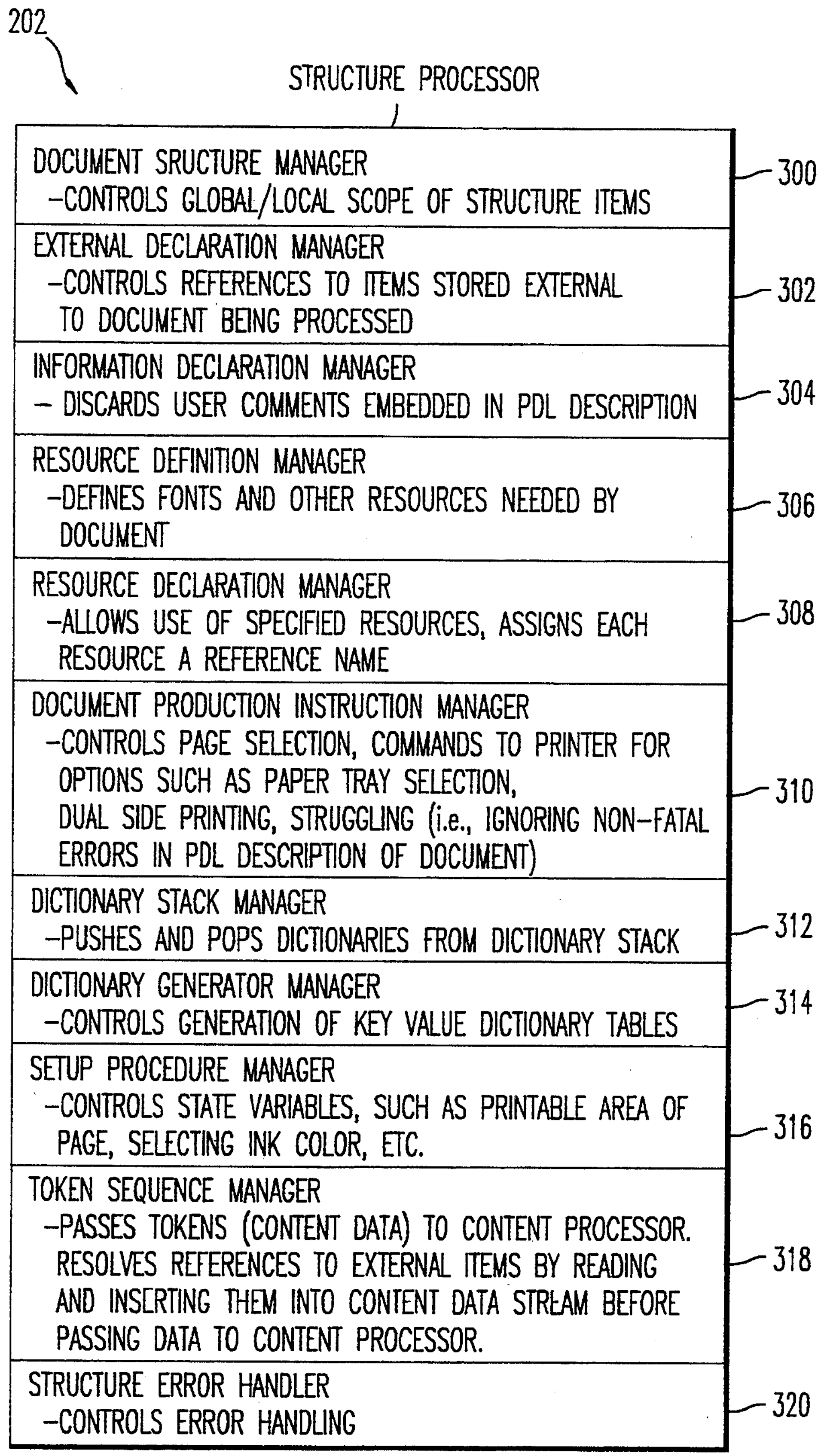
FIG. 6 is a flow chart of the process of interpreting structural commands by the Structure Processor of the preferred embodiment.

Referring to FIG. 6, the Structure Processor 202 contains the following software modules whose functions are briefly described by the text in FIG. 6: document structure manager 300, external description manager 302, information declaration manager 304, resource definition manager 306, resource declaration manager 308, document production instruction manager 310, dictionary stack manager 312, dictionary generator manager 314, setup procedure manager 316, token sequence manager 318, and structure error handler 320. These software modules decode corresponding elements in each prologue section of the document, and store representations of the resulting "printing command interpretation environment" as state parameters.

Token elements are passed by the Structure Processor to the Content Processor by token sequence manager 318.

Document production instructions, such as an instruction to print only pages 7 through 10 of a document are handled initially by the document production instruction manager 310 so as to store the appropriate production control values in data structure 232 (see FIG. 4). Thereafter, the document structure manager 300 uses the stored document production control values to skip over or discard sections of the document corresponding to unselected portions of the document, and to push and pop dictionaries onto the dictionary stack so as to provide the appropriate dictionaries for each section of the document that is selected for printing.

Document Content Processor

Figure 7:
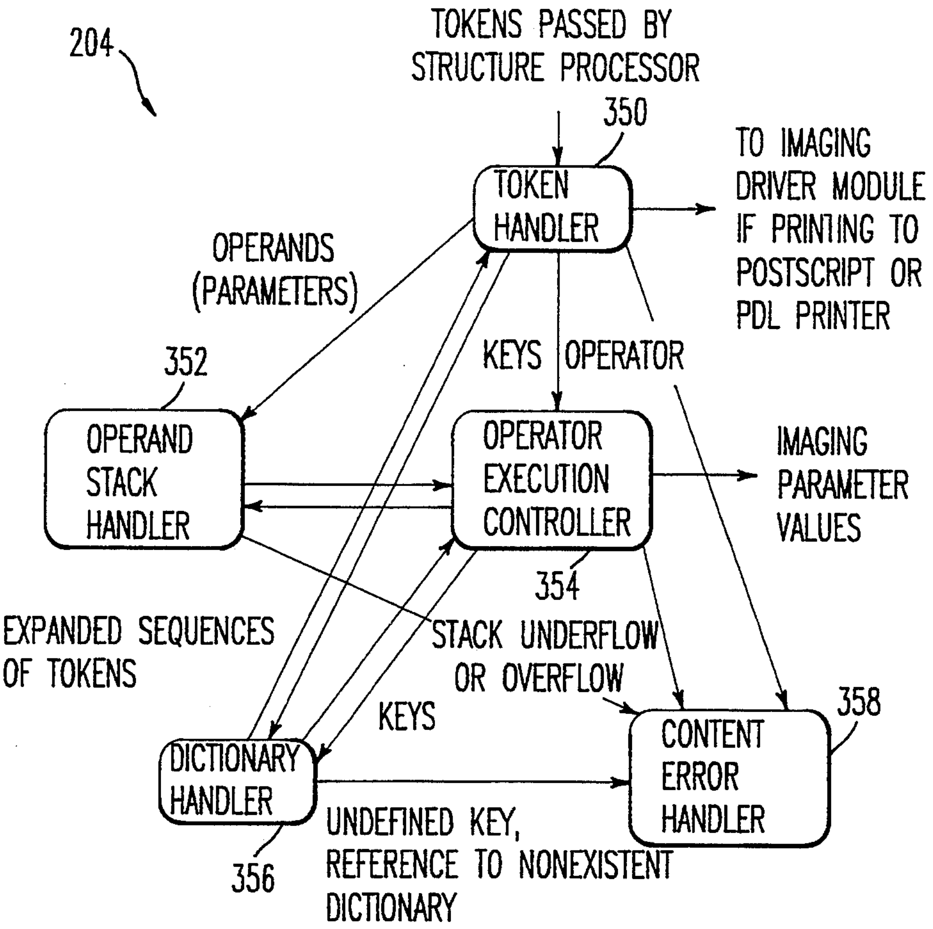
FIG. 7 is a block diagram depicting operation of the Content Processor of the preferred embodiment.

Referring to FIG. 7, the token sequence manager 204 has a token manager 350 which receives each token element to be processed. There are three special cases in which the token element is not interpreted by the Content Processor 204. If the document is not being printed, but instead is being transmitted to a remote device capable of processing PDL documents, the token manager 350 passes the element unchanged to the Imaging Driver Module. Similarly, if the document is being printed by a PDL capable printer (i.e., a printer which can interpret PDL documents), the content tokens are passed unchanged by the token handler to the Imaging Driver Module. Finally, if the document is being printed by a PostScript compatible printer (i.e., a printer which can interpret PostScript language documents), the content tokens are converted into equivalent PostScript tokens (using a simple table look-up conversion methodology) by the Token Handler 350 and then passed to the Imaging Driver Module.

Assuming that none of the exceptional cases just described above applies, and that therefore the token element received needs to be interpreted and converted into image data, the required content processing proceeds as follows. Operands for the element are pushed onto the operand stack by an operand stack handler 352, and then the operator portion of the element is "executed" or interpreted by operator execution controller 354. While interpreting token elements, the operator execution controller 354 uses the parameters previously pushed onto the stack and generates imaging parameter values, represent portions of the document being processed. The imaging parameter values are passed to the Imaging Driver Module.

A dictionary handler 356 is called by the token handler to convert parameter keys into parameter strings, and is called by the operator execution controller 354 to convert operator keys into corresponding strings of operator, and sometimes parameter values. Finally, errors such as stack underflows and overflows, and references to undefined keys or to a nonexistent dictionary are handled by a content error handler 358.

Imaging Driver Module

Figure 8:
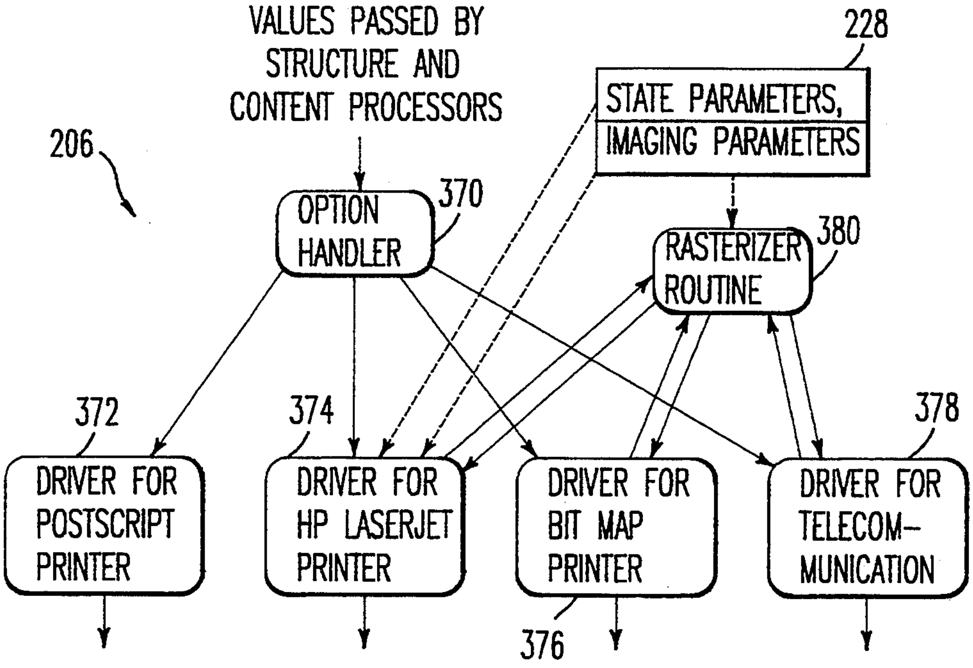
FIG. 8 is a block diagram depicting operation of the Imaging Driver Module of the preferred embodiment.

Referring to FIG. 8, the Imaging Driver Module 206 has an option handler that determines which of several imaging driver programs 372–378 are to be used to process the document. Driver programs are provided for PostScript printers, HP Laserjet and HP Laserjet emulation printers, bit map printers, and for sending documents to remote devices. A bit map printer is one that does not accept high level commands and therefore must be sent an image in the form of a rasterized bit map. A rasterizer routine 380 converts each page of the document into a bit mapped image, which can then be transmitted to a device such as a simple dot matrix or ink jet printer that does not have a built-in PDL or PostScript printer. The rasterizer routine 380 is also used when printing to an HP Laserjet or compatible printer for converting all portions of the document, excepting those text portions for which the printer has corresponding built-in or downloaded fonts, into bit map form.

The Imaging Driver Module 206 runs in parallel with the other modules of the image processor. As imaging parameters are written into data structure 228, the Imaging Driver Module 206 picks them up and processes them, either building up bit map images until a page is ready to be printed, or printing individual elements as they arrive.

Communication Processor

Figure 9:
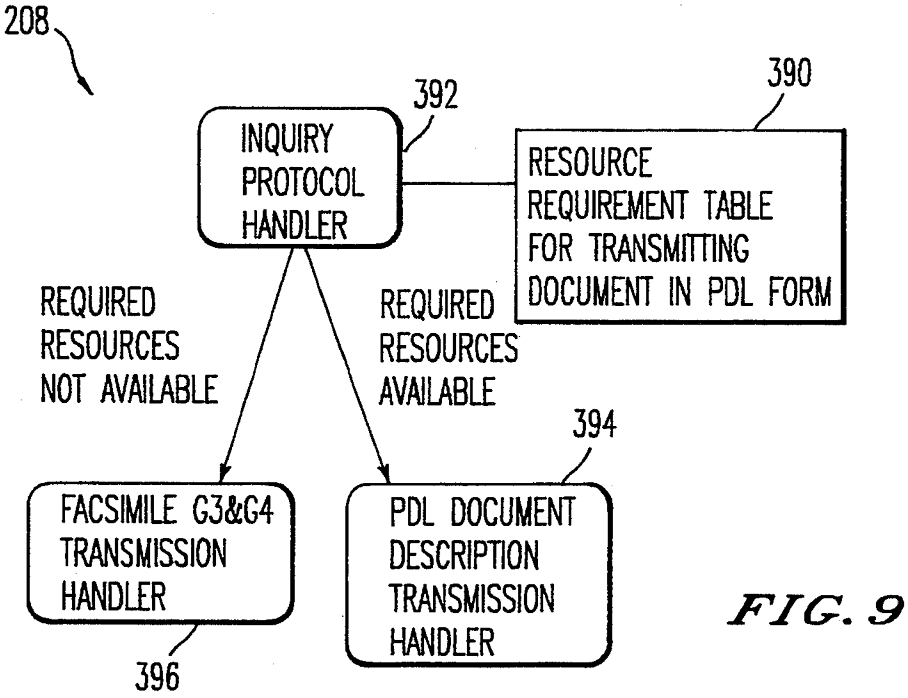
FIG. 9 is a block diagram of the communication processor software of the preferred embodiment for transmitting documents to remote devices.

Referring to FIG. 9, the communication processor 208 has the ability to either send a document in facsimile form to a remote facsimile machine, ,or to send a document in PDL format to a remote device that has the resources required for processing the document in that format. The communication processor 208 inspects the resources data structure 220 and builds its own resource requirement table 390, which is a listing of the resources, including memory, fonts, and so on, for processing the specified document. Then an inquiry protocol module 392 established a communication connection to a specified remote device, and queries that device to determine if it has all the resources listed in table 390. For instance, this could be done using the protocol for communication between facsimile machines which allows for special information to be passed between compatible machines.

If the remote device answers these queries with an affirmative answer, then module 394 is called for transmitting the document to the remote device in PDL document description format. PDL format is not only much more compact and therefore more efficient than sending a document in binary map form, it also provides much more information to the receiving device, allowing for instance the document to be easily edited and revised. However, if the remote device does not contain the required resources, the document will be transmitted to the remote device by module 396 in bit map form, typically using industry standard facsimile G3 or G4 transmission methodology.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of printing a document, the steps of the method comprising:

receiving a document represented by a stream of page description language elements which define said document as a hierarchical tree structure, said received document including a hierarchically ordered set of prologue sections containing prologue elements and content sections containing image defining token elements; wherein said prologue elements in each of said prologue sections are applicable only to those of said content sections subtended by said prologue section in the document's hierarchical tree structure;

converting image defining token elements in said content sections of said received document into corresponding imaging instructions for a predefined remotely located printer device;

decoding said prologue elements and storing representations thereof in a computer memory so that stored representations of only those prologue elements applicable to each content section of said document are utilized by said converting step while converting image defining token elements in each of said content sections of said document;

generating a required resource list representing a set of resources which are required for said remotely located printer device to print said received document when said received document to be transmitted to said remotely located printer device is represented by high level page description language commands;

querying said remotely located printer device to determine whether said remotely located printer device has resources corresponding to those represented by said required resource list;

transmitting said imaging instructions to said remotely located printer device using high level page description language commands, after said querying step, when said remotely located printer device responds affirmatively to said querying; and converting said imaging instructions into an image bit representation and then transmitting said image bit representation to said remotely located printer device, after said querying step, when said remotely located printer device does not respond affirmatively to said querying.

2. A document image printing controller, comprising:

means for receiving a document represented by a stream of page description language elements which define said document as a hierarchical tree structure, said received document including a hierarchically ordered set of prologue sections containing prologue elements and content sections containing image defining token elements; wherein said prologue elements in each of said prologue sections are applicable only to those of said content sections subtended by said prologue section in the document's hierarchical tree structure;

a content processor for processing said content sections of said received document and generating corresponding imaging instructions for a predefined remotely located printing device;

a document structure processor which processes said prologue elements, and stores representations thereof in a computer memory so that stored representations of only those prologue elements applicable to each content section of said document are available to said content processor while processing each said content section of said document; and an imaging driver processor for formatting and transmitting said imaging instructions to a printer port corresponding to said remotely located printing device;

wherein said imaging driver processor includes a first printer driver for transmitting said imaging instructions to a first printer port using high level page description language commands, and a second printer driver and a rasterizer for converting said imaging instructions into an image bit representation and then transmitting said image bit representation, via a communication port, to said remotely located printing device;

said document image printing controller including means for generating a required resource list representing a set of resources which are required for said remotely located printing device to print said received document when said received document to be transmitted to said remotely located printing device is represented by high level page description language commands;

said second printer driver including:

protocol means for querying said remotely located printing device to determine whether said remotely located printing device has resources corresponding to those represented by said required resource list;

means for transmitting said imaging instructions using high level page description language commands, after said protocol means performs said querying, when said remotely located printing device responds affirmatively to said querying by said protocol means; and means for transmitting said imaging instructions as an image bit representation, after said protocol means performs said querying, when said remotely located printing device does not respond affirmatively to said querying by said protocol means.

3. A method of transmitting a document, comprising the steps of:

a first determining step for determining resources needed to present a document which is encoded in a page description language;

a second determining step for determining if a remote presentation device contains the resources needed to present the document encoded in the page description language;

transmitting the document which is encoded in the page description language to the remote presentation device, after said second determining step is performed, when the second determining step determines that the remote presentation device does contain the needed resources;

converting the document encoded in the page description language into an image bit representation and transmitting said image bit representation to the remote presentation device, after said second determining step is performed, when the second determining step determines that the remote presentation device does not contain the needed resources.

4. An apparatus for transmitting a document, comprising:

first determining means for determining resources needed to present a document which is encoded in a page description language;

second determining means for determining if a remote presentation device contains the resources needed to present the document encoded in the page description language;

means for transmitting the document which is encoded in the page description language to the remote presentation device, after the determining by the second determining means, when the second determining means determines that the remote presentation device does contain the needed resources;

means for converting the document encoded in the page description language into an image bit representation and for transmitting said image bit representation to the remote presentation device, after the determining by the second determining means, when the second determining means determines that the remote presentation device does not contain the needed resources.

* * * * *